United States Patent [19]

Murray et al.

[11] Patent Number: 4,843,406

[45] Date of Patent: Jun. 27, 1989

[54] METHOD AND APPARATUS FOR DETECTING THE PRESENCE OR ABSENCE OF A PEN IN PEN RECORDER

[75] Inventors: Richard A. Murray, San Diego; John White, Escondido; George K. Branner, San Diego, all of Calif.

[73] Assignee: Enter Computer, Inc., San Diego, Calif.

[21] Appl. No.: 134,032

[22] Filed: Dec. 17, 1987

[51] Int. Cl.[4] .................... G01D 9/00; G01D 15/16; G01D 9/30; G06F 15/626
[52] U.S. Cl. ................. 346/1.1; 346/139 R; 346/46; 346/49; 346/141; 364/520
[58] Field of Search ............ 346/46, 49, 139 R, 141, 346/1.1; 364/520

[56] References Cited

U.S. PATENT DOCUMENTS

| | | | |
|---|---|---|---|
| 2,778,710 | 1/1957 | Komas | 346/139 R |
| 4,405,931 | 9/1983 | Fujisawa | 346/139 R |
| 4,517,576 | 5/1985 | Sugawara | 346/139 R |
| 4,518,972 | 5/1985 | Gunderson et al. | 346/139 R |
| 4,573,129 | 2/1986 | Tribolet | 346/139 R |
| 4,660,054 | 4/1987 | Kajikawa et al. | 346/139 R |
| 4,716,420 | 12/1987 | Glassett | 346/139 R |

*Primary Examiner*—Goldberg E. A.
*Assistant Examiner*—Mark Reinhart

*Attorney, Agent, or Firm*—Knobbe, Martens, Olson & Bear

[57] ABSTRACT

The present invention comprises an apparatus and method for sensing whether a pen is in the grasp of a pen claw of a drawing arm or a plotter or other graphics mechanism. More specifically, the present invention comprises a pen claw movable between an upward position and an downward writing position, the pen claw being connected to a detector which detects both upward and the downward movements of the pen claw. The pen is provided with an annular ring extending therefrom and the plotter mechanism has a stop provided thereon. The method for sensing the pen's presence comprises the steps of: first, positioning the pen claw in a position proximate to the stop; second, energizing the pen claw until either the pen is substantially impeded by the stop or until the pen claw moves substantially beyond the distance at which it would have stopped if the pen ring had contacted the stop; third, simultaneously with the second step measuring the distance the pen claw has moved subsequent to energization; and fourth, depending upon the distance of movement, providing a signal indicating either that a pen is in the grasp of the pen claw or that a pen is not in the grasp of the pen claw. Thus the present invention provides a system and method for sensing a pen that uses a device for measuring the vertical movement of the pen claw which is already installed on a number of drawing arms.

15 Claims, 3 Drawing Sheets

METHOD AND APPARATUS FOR DETECTING THE PRESENCE OR ABSENCE OF A PEN IN PEN RECORDER

BACKGROUND OF THE INVENTION

1. Field of the Invention

The present invention relates to plotting mechanisms having a drawing arm capable of selecting one of a plurality of pens. More specifically, the invention relates to a computer controlled mechanism for sensing that a pen is in the grasp of a drawing arm.

2. The Prior Art

In the present era of automation, numerous devices are being developed that will accurately, efficiently, and quickly perform tasks that just a few years ago were performed manually. A large portion of the reason for automation is the rapid development of computers from the early room-sized devices to the present desk top personal computer. Microprocessor controlled devices such as the personal computer have greatly expanded capabilities for efficiently and accurately processing large amounts of data or other information. However, simply processing the data is not enough; the degree to which a computer is able to effectively convey data and other results of its processing to the user is a key measure of its utility to the user.

In recent years, graphical output has become an increasingly popular and commonly used form of output. For example, with presently available software, such as SPICE, an engineer can simulate complex circuits without ever building them. Rather than presenting the results of such a simulation in a large table of numbers, it is much more desireable and useful to present the output of the simulation in graphical form, such as a plot of output voltage vs. input voltage. This graphical output can be either sent to the screen of a CRT for viewing by the user, or to a plotting mechanism which makes a "hard-copy" of the graph on paper.

As another example of a plotting mechanism, Hewlett-Packard has developed a plotter that can be directly connected to a circuit in the same manner as an engineer could connect an oscilloscope. Thus a trained operator can easily obtain an accurate "hard-copy" of all the information viewable on a oscilloscope, including circuit characteristics such as voltage vs. time or output voltage vs. input voltage.

Plotter mechanisms can also be useful in the business world to provide graphical output such as stock trends against time, or to compare trends in various money markets against time. The output possibilities for plotter mechanisms are limited only by the size of the paper that can be inserted into the particular device. Many existing plotters allow the user to color various portions of his plot with a particular color of his choice. For example, an engineer may wish to compare several functional characteristics on same graph, and for that purpose he may select green for one characteristic, blue for another, and black for another. As another example a stock analyst may find it useful to have separate market trends appear in different colors. For example, the NYSE volume may appear in red, and the Tokyo Stock Exchange volume in blue. This capability for color selection is an important commercial element of virtually all plotters on the market today.

The mechanism for color selection typically includes a rotatable circular carousel having a plurality of pens affixed along its perimeter, each pen being a different color and also being removable from its position on the perimeter. Thus, when a certain pen is to be used for coloring a portion of the plot, a control device, often including a microprocessor, rotates the carousel until the chosen pen is at a transfer point where it can be grasped by a drawing arm. Then the chosen pen may be manipulated by the drawing arm under control of the plotter's control device in order to draw the graph or other figure on paper or any other writing surface.

Color selection occurs automatically as a result of programming, for example, an operator may remotely command the plotter to color the background grid in black, the descriptive writing in blue, and one or more graph lines in green, red, or any other colors. Thus, the graphing process may proceed without operator supervision.

However, a problem arises if at some time in the automatic printing sequence, a pen is non-existent in the selected penholder. In that instance, the drawing arm at the transfer point will attempt to grasp a pen which is non-present, and in fact will grasp nothing. If the plotter is not equipped with a pen sensor of some type, the plotter mechanism will not be aware that a pen is not in the drawing arm, and will continue to direct drawing motions as if a pen were in place. As a result, portions of a graph or other figure may not be drawn. If someone happens to notice that the plotter is attempting to make a drawing without a pen, he or she would probably stop the plotting process, insert a pen in the pen holder, and command the plotter to start again. If the omission is not noticed, the results of failure to draw a portion of a figure may be more serious; the graph or figure might be thought complete and relied upon as such. Costly mistakes or at least substantial embarrassment may be caused by such an error.

Previous pen sensing mechanisms include a variety of systems for detecting the presence of a pen being held by the drawing arm. These mechanisms include optical switches or mechanical switches, each of which is actuable by the existence of a pen in the pen holder. Each switch may be connected to provide an input to a control device, thereby providing direct information to the control device as to the presence or non-presence of a pen.

For example, a mechanical switch may be affixed at a position where the pen (if it is present) will brush against the switch toggle as the drawing arm moves away from the carousel, thereby actuating the switch and providing an output to the control device which is indicative of the presence (or non-presence) of the pen being held by the drawing arm. As an alternate to affixing the switch to the plotter, previous devices have also used a mechanical switch affixed to the drawing arm, so that a pen grasped by the arm will actuate the switch to provide a digital output to the control device.

Alternatively, an optical detection system may be used to detect the pen's presence. One type of such a system uses a LED (Light Emitting Diode), an optical detector, and specially mirrored pens. The light being emitted from the LED bounces off the mirrored pen (if present in the drawing arm) and actuates the optical detector which then provides a signal indicative the pen's presence. Such an optical detection system has a disadvantage because the optical detector is sensitive to ambient light and therefore has an inherent reliability problem; for example, ambient light may actuate the optical detector, falsely indicating the presence of a pen.

Both systems described above, the mechanical switch system and the optical switch system require additional components. These components have a sole, specific purpose, which is to detect the presence or non-presence of a pen. For example, a manufacturer, having selected the switch detection method, must install a switch in the drawing arm or at some location in the plotter mechanism to detect the pen's presence. Different manufacturers who have selected the optical detection method must install a LED, an optical detector, implement a detection algorithm in the control device, and in addition must require the operator to use the specially mirrored pens.

Therefore, both the optical detection system and the mechanical switch system result in additional manufacturing costs.

Furthermore, it is axiomatic that each added component has a probability for failure that is present upon manufacture, and which increases after a time period of use and misuse. Thus, for a manufacturer and for a consumer, the presence of the additional components (the mechanical switch, or the LED and optical detector) introduces a reliability factor in addition to the increased cost.

It would be an advance in the art to provide a method and a device for sensing the presence (or non-presence) of a pen in the drawing arm that does not use specialized components and switches. It would be a further advancement in the art to provide a reliable, low cost, and easily implemented method and device for detecting the presence of a pen being held by a drawing arm.

BRIEF SUMMARY OF THE INVENTION

The present invention overcomes the disadvantages of previous pen sensing mechanisms by providing a simple, low cost pen sensing system that can be implemented using components substantially similar to those existing on many plotting mechanisms.

The present invention comprises an apparatus and method for sensing whether a pen is in the grasp of a pen claw of a drawing arm of a plotter or other graphics mechanism. More specifically, the present invention comprises a pen claw movable between an upward storage position and a downward writing position, the pen claw being connected to a detector which detects both upward and the downward movements of the pen claw. The pen is provided with an annular ring extending therefrom and the plotter mechanism has a stop provided thereon. The method for sensing the pen's presence comprises the steps of: first, positioning the pen claw in a position proximate to the stop; second, vertically moving the pen claw until either the pen is substantially impeded by the stop or until the pen claw moves substantially beyond the distance at which it would have stopped if the pen ring had contacted the stop; third, simultaneously with the second step measuring the distance the pen claw moved vertically; and fourth, depending upon the amount of vertical movement, providing a signal indicating either that a pen is in the grasp of the pen claw or that a pen is not in the grasp of the pen claw. Thus the present invention provides a system and method for sensing a pen that uses a device for measuring the vertical movement of the pen claw which is already installed on a number of drawing arms, and also provides a novel stop to prevent substantial vertical movement if a pen is present so that sensing may occur.

These and other advantages and features of the present invention will become more fully apparent from the following description and appended claims taken in conjunction with the accompanying drawings.

BRIEF DESCRIPTION OF THE DRAWINGS

FIG. 4A shows the downward limited position of the pen claw with a pen in its grasp, and FIG. 4B illustrates the downward limited position of the pen claw without a pen in its grasp.

DETAILED DESCRIPTION OF THE PREFERRED EMBODIMENT

Figure 1:
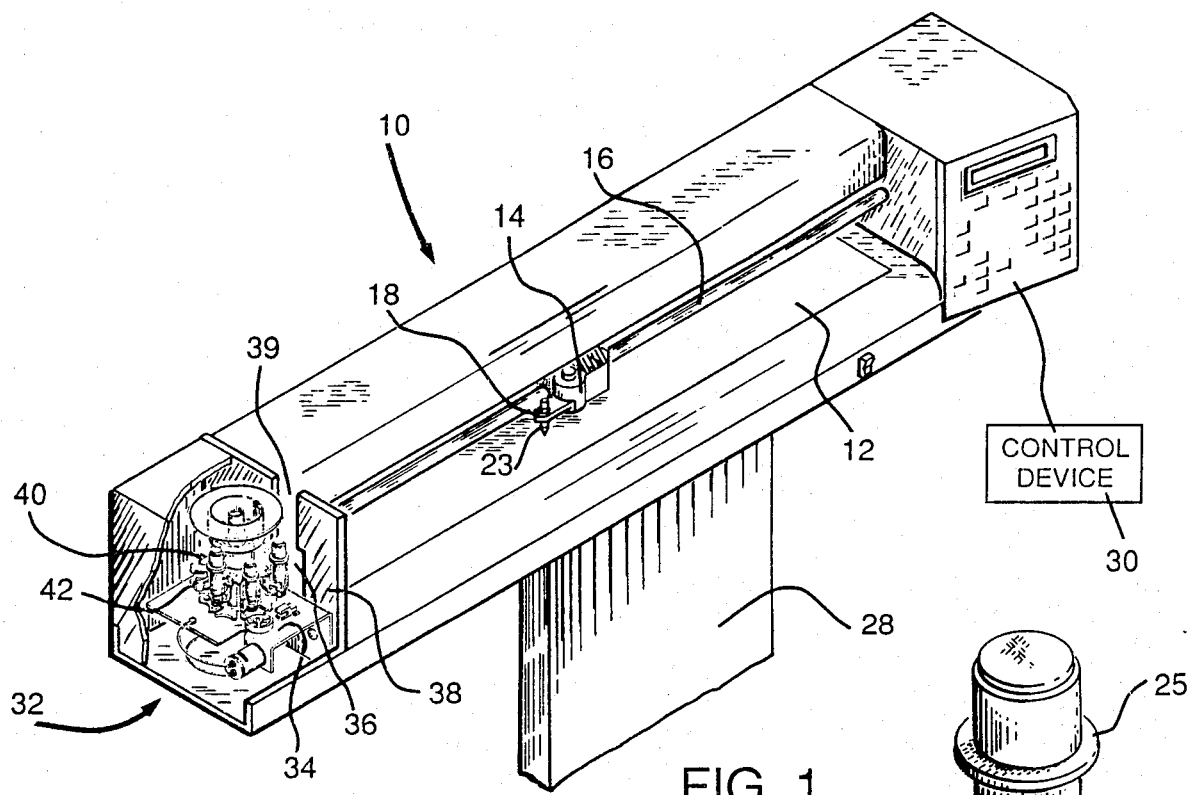
FIG. 1 is a perspective view of a plotter mechanism.

The present invention may be incorporated into any of a plurality of plotter mechanisms that provide the capability for choosing from any of a plurality of colored pens, and then drawing with that pen. Many such plotters are commercially available, such as the Hewlett Packard Model HP 7580, the Houston Instruments DMP-51MP series, and the CalComp 1040 series.

These and other plotters comprise a drawing arm which first chooses the colored pen from a plurality of pens provided on a rotating carousel. The chosen pen is rotated to a transfer point where it is transferred to a pen claw having opposed fingers for holding the pen. The pen claw is attached to a drawing arm, which first moves the pen to the desired starting point, and then moves it into contact with paper or another drawing surface. Virtually any image can be drawn by such a computer-controlled mechanism by directing a series of movements of the drawing arm or the paper, or by directing simultaneous movements of both the drawing arm and the paper. When the plotter has completed drawing with one color, the drawing arm returns the pen to its place in the carousel. If desired, a new pen is chosen and the above-described drawing process is continued with this next chosen pen.

The invention is best understood by reference to the figures wherein like parts are designated with like numerals throughout.

Figure 2:
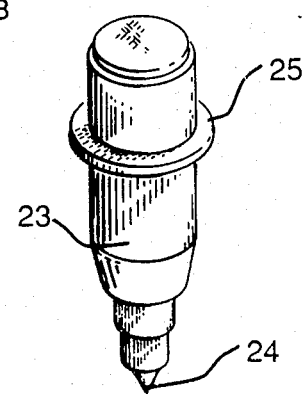
FIG. 2 is a perspective view of a typical pen used in a plotter mechanism.

FIG. 1 illustrates, in perspective, an exemplary plotter mechanism 10 incorporating the preferred embodiment of the present invention. This plotter mechanism 10 comprises a drawing surface 12, and a drawing arm 14 slidable on a drawing arm slide bar 16. The drawing arm 14 includes a pen claw 18 holding a drawing pen 23. FIG. 2 shows a typical drawing pen 23 having a cylindrical shape tapered toward the drawing end 24, and having an annular ring 25 extending therefrom.

Figure 3A:
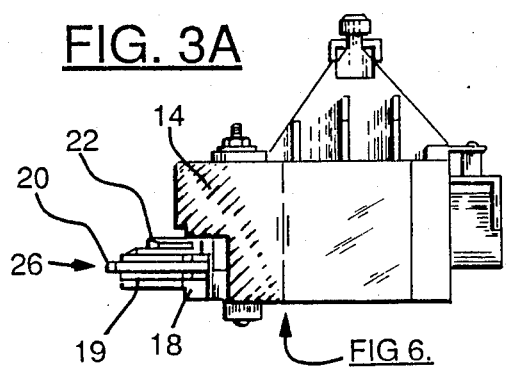
FIGS. 3A and 3B are elevation views of a drawing arm, FIG. 3A showing the pen claw in the upward position and FIG. 3B showing the pen claw holding the pen in the downward writing position.
Figure 3B:
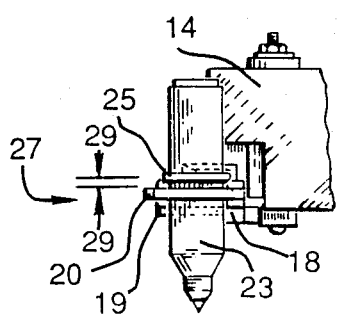
Figure 6:
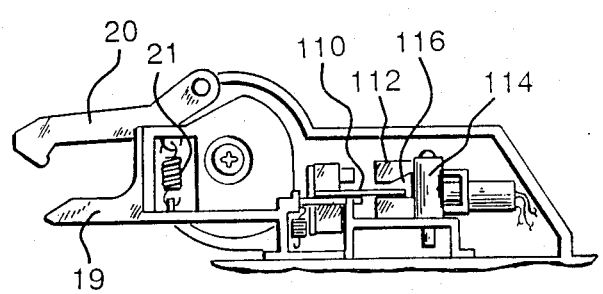
FIG. 6 is a cross section view of the drawing arm along the lines 6—6 in FIG. 3A.

In the preferred embodiment as shown in FIG. 3A and FIG. 3B, the drawing arm 14 and the pen claw 18 are shown in more detail. The pen claw 18 comprises a fixed arm 19 and a clasping arm 20, between which a pen 23 (shown in FIG. 3B) may be grasped. As shown in FIG. 6, the clasping arm 20 is connected to a spring which provides a force on the arm 20 in a direction towards the fixed arm 19 so that the pen 23 may be firmly wedged between the arms 19, 20. Referring again to FIGS. 3A and 3B, a retaining slot 22 is provided on the fixed arm 19 into which the annular ring 25 on the pen 23 snugly fits. As a result, when the pen 23 is grasped by the pen claw 18 as shown in FIG. 3B, it is held firmly by a mechanical interaction between the ring 25, the retaining slot 22, the clasping arm 20, and the fixed arm 19.

Also, it should be noted that clasping arm 20, as shown in FIG. 3B, clasps the pen 23 below the ring 25, so that there is a gap 29 between the ring 25 and the proximate portion of the clasping arm 20.

By comparing FIGS. 3A and 3B, it can be seen that the pen claw 18 is moveable with respect to the drawing arm 14 to and from an upward lifted position 26 shown in FIG. 3A to a downward writing position 27 shown in FIG. 3B. In the upward lifted position 26 shown in FIG. 3A, a pen 23 would not be in contact with the drawing surface 12 shown in FIG. 1, and thus, the drawing arm 14 may slide across the slide bar 16 to move to any starting position over the drawing surface 12 without marking the drawing surface 12 with the pen 23. Referring again to FIG. 1, with the pen 23 in the downward writing position 27, the pen 23 is forced into contact with a writing material (not shown), such as paper, provided over the drawing surface 12.

The plotter mechanism 10 shown in FIG. 1 is also provided with a stabilizing stand 28 upon which it may rest, and is also connected to a power supply such as 110 volt 60 Hz A.C. (not shown). Furthermore, the plotter mechanism 10 is connected to a control device 30 (shown in block in FIG. 1), part or all of which may be incorporated into the body of the plotter mechanism 10. In the preferred embodiment, the control device 30 comprises a microprocessor-controlled digital processing system.

Referring again to FIG. 1, a carousel rotation assembly generally shown at 32 is provided on a base plate 34 affixed to a side wall 38 of the plotter mechanism 10. The purpose of this carousel rotation assembly 32 is to present any of a plurality of pens 23 at a transfer position 36, where the presented pen 23 can be grasped by the pen claw 18, or conversely, where the pen claw 18 can return the pen 23 currently in its grasp. An aperture 39 is provided in the side wall 38 to permit passage of the pen 23 and the pen claw 18. An annular carousel 40 is provided with a plurality of pen holders 42 spaced about its perimeter. The carousel rotation assembly is more fully disclosed in an application Ser. No. 134,011 entitled "Indexing Mechanism" filed of even date herewith by Richard A. Murray, the specification and drawings of which are incorporated by reference herein.

Each pen holder 42 is adapted to hold one pen 23. As is well-known, if the control device 30 is programmed either to remove a pen 23 from the carousel 40, or to replace a pen 23 previously removed, then the drawing arm 14 is moved axially along slide bar 16 through the aperture 39 until the pen claw 18 is proximate to the desired pen holder 42, and an exchange is made between the pen claw 18 and the pen holder 42 to either remove or replace a pen 23 in any known manner. After the pen claw 18 has removed a pen under the control of the control device 30, then the drawing arm 14, holding the pen 23 in the upward lifted position 26 illustrated in FIG. 3A moves axially along the slide bar 16 from the carousel 40 towards the configuration illustrated in FIG. 1 where the pen 23 is over the drawing surface 12.

Figure 4A:
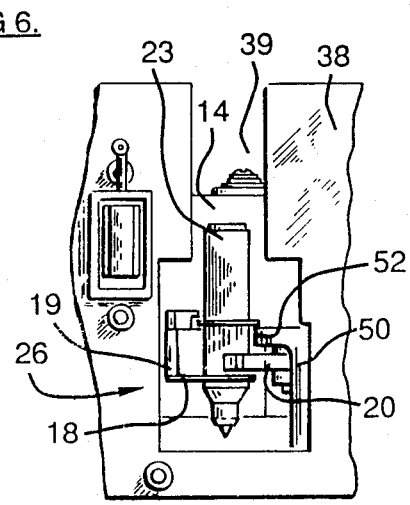
FIGS. 4A and 4B are elevation views of a pen, a pen claw, and a pen stop illustrating the relationship between the pen ring and the pen stop.

FIG. 4A illustrates a side view of the preferred embodiment looking through aperture 39 from carousel 40 towards the pen claw 18 holding a pen 23. FIG. 4A also illustrates a novel stop 50 affixed to the plotter mechanism. The pen stop 50 has a tip 52 of width smaller than the gap 29 shown in FIG. 3B between the clasping arm 20 and the ring 25. In the upward lifted position 26, the pen claw 18 holding a pen 23 can move axially along the slide bar 16 shown in FIG. 1, substantially unimpeded by the tip 52 of pen stop 50. In the preferred embodiment, the pen stop 52 may comprise a solid material such as stiff plastic.

Figure 4B:
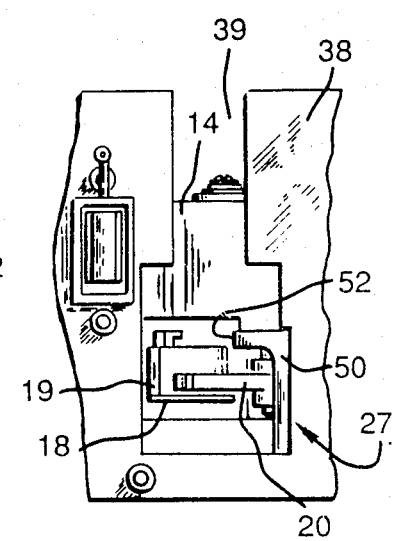

The pen sensing process of the preferred embodiment of the present invention is initiated by moving the drawing arm 14 axially along the slide bar 16 until the annular ring 25 is above the tip 52 of pen stop 50. This sensing configuration is shown in the top view illustrated in FIG. 7. From this configuration, the pen claw 18 is moved downward until substantial resistance is detected as a result of contact between the annular ring 25 and the pen stop tip 52. Referring again to FIG. 4A, it can be seen that the length of the downward movement of the pen claw 18 is substantially limited by the pen stop tip 52. The range of movement permitted in this configuration is the "pen ring to pen stop range." If, however, a pen 23 is not present in the pen claw 18, then the configuration is that illustrated in FIG. 4B. The pen claw 18 is moved to the sensing configuration FIG. 7, and then moved downward. Without the pen 23 in place, downward movement is unimpeded through a much longer distance, a "free range." Thus, by measuring the distance that the pen claw 18 can move downward, it can be determined whether or not a pen 23 is in the grasp of the pen claw 18.

As is well-known, the upward and downward movements of the pen claw 18 as well as its axial movements along the slide bar 16 are controlled by a suitable electronic control device such as the control device 30 which includes a microprocessor in the preferred embodiment. Furthermore, it is common for a drawing arm 14 to be manufactured with location sensors of various types to indicate whether the pen claw 18 is up, down, or at points in-between, and to provide that information to the control device 30. Thus, by installing a novel pen stop 50, the present invention can be embodied in any plotter mechanism 10 having such a location sensor in the drawing arm 14.

Figure 5:
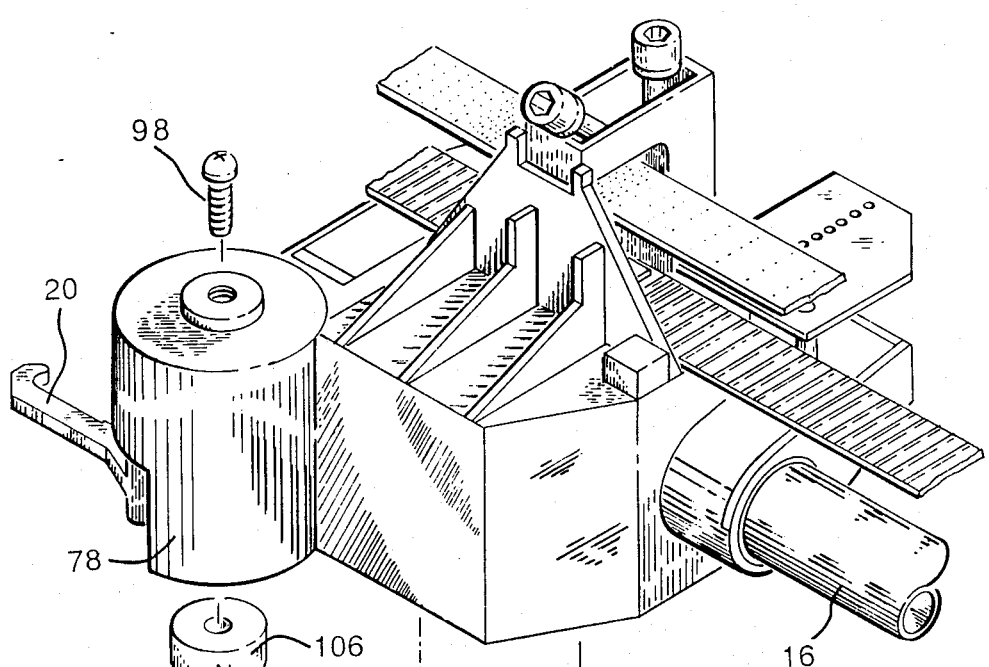
FIG. 5 is a partial exploded view of the pen claw showing the apparatus for vertically moving the pen claw and for measuring the vertical distance the pen claw has moved.

The preferred embodiment comprises a drawing arm 14 as illustrated in the exploded view of FIG. 5 and the cross-section of FIG. 6.

Referring to FIG. 5, the preferred embodiment comprises a mechanism for moving the pen claw 18 vertically, shown exploded from a tubular structure 78. The fixed arm 19 is rigidly attached to a pen claw body 80 having a cylindrical inner surface 82. The upper edge of the cylindrical inner surface 82 comprises a shoulder 84 which engages with a lower flange 86 provided on a voice coil 88. An upper flange 90 of the voice coil 88 is engageable with a cup (not shown) within tubular structure 78. A linear bearing assembly 92 is provided having an shaft 93 including an upper end 94 and a lower end 96. The lower end 96 comprises threading to respectively accept a screw 100. Also provided are a tubular metal cup 102 enclosed by having a metal surface 104 on one end; and having an opening on the other end. Furthermore, a magnet 106 is provided having a cylindrical shape.

When assembled, the magnet 106 rests against the metal covering 104, and the upper shaft shaft 94 extends through the inner tubular portion of metal cup 102. The magnet 106 is connected to the cup (not shown) within the tubular structure 78 by, for example, an adhesive material. The upper shaft 94 is movable within the cup 102, and the linear bearing 92 is engaged partially within the tubular opening of the metal cup 102 and partially extends through the inner cylindrical portion of the voice coil 88. The lower shaft 96 extends through the cylindrical bore 82 of the pen claw body 80, and is affixed to the pen claw body 80 by the screw 100. The upper shaft 94 and the linear bearing 92 are movable with respect to the cup 102 and thus the pen claw body can move up and down along the axis defined by the shaft 93. The control device 30 (shown in block in FIG. 1) comprises a power supply (not shown) which is connected to the voice coil 88. As a result, movement of the voice coil 88 is variably controlled in any well-known manner by the control device 30.

In the preferred embodiment, the voice coil 88 moves at a variable rate of speed in response to application of a correspondly variable current by the control device 30. Thus, by applying a variable current ot the voice coil 88, the control device 30 can move the pen claw 18 up or down at a variable rate. As previously discussed, a pen 23 to be sensed is moved downward against a pen stop 50. To prevent the pen 23 from being jarred or knocked loose by contact with the pen stop 50, the control device 30 of the preferred embodiment comprises programming to gently move the pen claw 18 downward by applying, for example, a current to the voice coil 88, small enough to allow the pen claw 18 to come to a stop without jarring the pen 23 or knocking it loose.

As a location sensor for sensing the direction and amount of vertical movement of the pen claw 18, the preferred embodiment comprises an encoding strip 110 and an encoder 114. As shown in FIG. 6 the pen claw body 80 is connected to the planar rectangular encoding strip 110 having an edge 112 that engages within the encoder 114. Referring to the cross-section in FIG. 6, the edge 112 is shown engaged within a slot 116 of encoder 114. Thus, as the pen claw 18 moves vertically, the edge 112 also moves vertically within the slot 116.

In the preferred embodiment, the encoder 114 comprises a modular quadrature optical linear encoder, such as one of the Hewlett-Packard HEDS 9500 series. Together with a suitable encoding strip also available from Hewlett-Packard, the encoder 114 in the preferred embodiment provides a digital output indicative of both the direction of movement and the distance of movement in increments of 0.002 inch.

Thus, it is well-known that an output of the encoder 114 is indicative of movement of the encoding strip 110. The encoder 114 is connected to the control device 30, so that the control device 30 can process the output and determine the vertical position of the pen claw 18.

Figure 8:
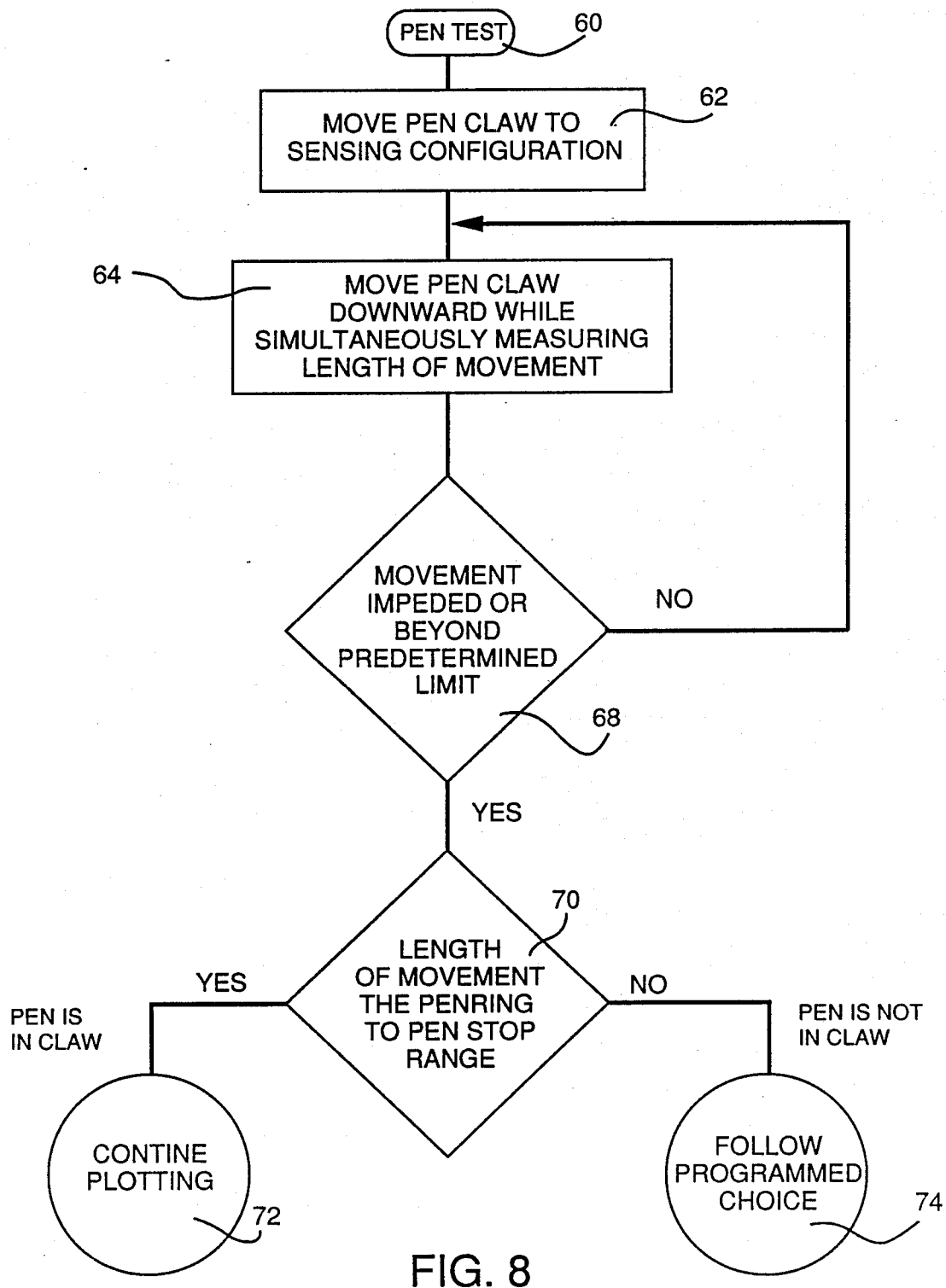
FIG. 8 is a flow chart illustrating operation of the control device.

FIG. 8 is a flow chart illustrating operation of the preferred embodiment. It should be apparent to those skilled in the art that these operations can easily be implemented in any of a variety of ways, the particular implementation being dependent upon the given control device and hardware. Operation begins in box 60 when a command 60 is generated to test for whether or not a pen 23 is in the grasp of a pen claw 18. This command 60 may, for example, be automatically generated whenever a pen 23 is removed from a pen holder 42. After receipt of this command 60, the control device 40 then moves to the box 62 where it operates to move the pen claw 18 to the sensing configuration. Next, operation of the control device 30 moves to the box 64 where it begins movement of the pen claw 18 downward while simultaneously measuring the length of movement. A determination is then made in the decision box 68 as to whether or not movement has been impeded or is beyond a predetermined limit, and if not, operation of the control device 30 returns to the box 64 and continues downward movement. After the movement has been impeded, as for example by contact between the pen ring 25 and the pen stop tip 52, or after the movement is beyond a predetermined limit, as for example after the distance is beyond that expected if a pen 23 were in the grasp of the pen claw 18, then operation of the control device 30 moves to the box 70 where a determination is made as to whether or not the length of the movement was within the pen ring to pen stop range. If it is within that range, the pen 23 is in the grasp of the pen claw 18, and operation of the control device 30 moves to the box 72 where it continues plotting. If, however, the length of movement was not within the pen ring to pen stop range, then a pen 23 is not in the claw 18, and control operation moves to the box 74 where a pre-programmed choice is followed, for example, rotating the carousel 40 to another pen holder 42, attempting to grasp a pen 23, and again testing for a pen 23 as in FIG. 8.

In the preferred embodiment, the pen sensing method comprises first positioning the drawing arm 14 so that the ring 25 of the pen 23 is above the pen stop 50, and then moving the pen claw 18 downward.

Typically, and in the preferred embodiment, when a pen 23 is removed from the carousel 40, the pen claw 18 is in the upward lifted position 26 shown in FIG. 3A. Thus, in the preferred embodiment, it is natural to then maintain the pen claw 18 in the upward position 26 while moving it to the sensing configuration illustrated in FIG. 7.

Figure 7:
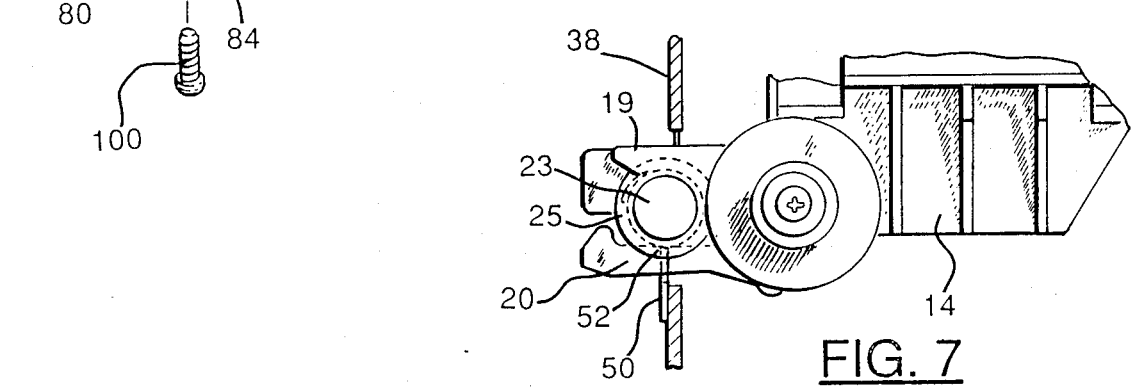
FIG. 7 is a top perspective view of the pen stop and the pen claw holding a pen above the pen stop. This is the sensing configuration.

Alternative embodiments of the present invention may be comprised in graphics mechanisms that remove a pen 23 from the carousel 40 with the pen 23 in the downward position 27 of FIG. 3B, or comprised in graphics mechanisms that first move the pen claw 18 downward before moving to the sensing configuration shown in FIG. 7. In these embodiments, the pen sensing method comprises first positioning the pen stop 50 above the pen ring 25, so that the pen claw 18 moves upward to sense the presence of a pen 23.

Additional alternative embodiments may comprise any type of shoulder that is existent when a pen 23 is in the grasp of a pen claw 18, but non-existent when a pen 23 is not in the grasp of the pen claw 18. For example, the clasping arm 20 of the preferred embodiment extends outward from the pen 23 when it is holding the pen 23, but retracts inward when a pen 23 is not in its grasp. Thus, the clasping arm 20 of the preferred embodiment presents a shoulder when a pen 23 in its grasp, which in that embodiment is positionable proximate to the pen stop 50. In that embodiment, the shoulder presented by the clasping arm 20 performs substantially the same function as the annular ring 25 on the pen 23; the shoulder substantially impedes vertical movement when adjacent to the tip 52 of the pen stop 50.

Further alternative embodiments may comprise a pen stop 50 incorporated into the plotter mechanism 10 at a location other than that affixed to the side wall 38. Such a pen stop 50 could be a further distance from the carousel 40, closer to the carousel 40, or even incorporated into the carousel 40. The pen stop 50 simply presents a resistance against which ring 25 of the pen 23 or any other shoulder provided in alternative embodiments may press to substantially impede vertical movement of the pen claw 18.

What is claimed:

1. A method for sensing whether a pen is in the grasp of a pen claw of a drawing arm of a plotter or other graphics mechanism, the graphics mechanism also having a reference stop, the pen including an annular ring extending therefrom, the pen claw defining a reference ring by systematically positioning said pen so that said annular ring defines a pen reference ring, said pen reference ring being present with respect to the pen claw regardless of the existence of the pen, said pen claw being vertically movable a reference distance between an upward position and a downward position, said method comprising the steps of:

first, positioning the pen claw in the upward position;
   second, positioning the drawing arm proximate to the reference stop, so that the reference ring is held by the pen claw above the reference stop;
   third, energizing the pen claw to move downward while measuring a test distance that the pen claw has moved from the upward first position until the pen claw is substantially impeded in its downward movement or until the pen claw attains the downward position, whichever occurs first; and
   fourth, comparing the test distance that the pen has moved with the reference distance from the upward position to the downward position of the pen claw, to conclude either that the annular ring of the pen has substantially impeded downward movement of the pen claw by contact with the reference stop or that the reference ring has passed unimpeded through the reference stop, thereby confirming either an existence or a lack of a pen in the pen claw.

2. A method for sensing whether a pen is in the grasp of pen claw of a drawing arm of a plotter or other graphics mechanism, the graphics mechanism also having a reference stop, the pen including an annular ring extending therefrom, the pen claw defining a reference ring by systematically positioning the pen so that the annular ring defines a pen reference ring, the pen reference ring being present with respect to the pen claw regardless of the existence of the pen, the pen claw being vertically movable a reference distance between an upward position and a downward position, said method comprising the steps of:

first, positioning the reference ring proximate to the reference stop;
   second, energizing the pen claw to move vertically so that the reference ring moves in a direction toward the reference stop; and
   third, observing whether the pen claw is substantially impeded in the third step when the reference ring is adjacent to the reference stop.

3. The sensing method as claimed in claim 2 further comprising a fourth step, providing an output indicative of whether the vertical movement of the pen claw is substantially impeded when the reference ring is proximate to the reference stop, whereby an output is provided indicative of whether a pen is in the grasp of the pen claw.

4. A method for sensing whether a pen is in the grasp of a pen claw of a drawing arm of a plotter or other graphics mechanism, the pen and the pen claw defining a horizontally-extending shoulder at a fixed vertical distance with respect to the pen claw when the pen is in the grasp of the pen claw, the pen claw not defining the shoulder at the fixed vertical distance when the pen is not in the grasp of the pen claw, said pen claw being vertically movable between a storage position and a writing position, said method comprising the steps of:

first, providing a pen stop on the plotter or other graphics mechanism;
   second, positioning the pen claw so that the shoulder, if present, is proximate to the pen stop;
   third, energizing the pen claw to move vertically so that the shoulder, if present, will be substantially impeded by the pen stop; and
   fourth, observing whether the pen claw is substantially impeded in its vertical movement in the third step.

5. The sensing method as claimed in claim 4 further comprising a fourth step, providing an output indicative of whether the vertical movement of the pen claw is substantially impeded when the shoulder is proximate to the pen stop, whereby an output is provided indicative of whether a pen is in the grasp of the pen claw.

6. The sensing method as claimed in claim 4 wherein, in the second step, the shoulder is positioned vertically above the pen stop so that in the third step, the pen claw moves downward.

7. The sensing method as claimed in claim 4 wherein the pen comprises the shoulder.

8. The sensing method as claimed in claim 7 wherein the pen comprises an annular ring having the shoulder.

9. The sensing method as claimed in claim 4 wherein in the third step, the pen claw is energized to move in a gentle manner.

10. An apparatus for sensing whether a pen is in the grasp of a pen claw of a drawing arm of a plotter or other graphics mechanism having a control device, the pen claw being vertically movable with respect to the drawing arm between an upward position and a downward position, said apparatus comprising:

a shoulder extending from the pen claw when a pen is in the grasp of the pen claw, said shoulder not extending from the pen claw when a pen is not in the grasp of the pen claw;
    a stop connected to the plotter mechanism in a position to engage with said extended shoulder when the pen claw is proximate to the pen stop, so that the engagement between the stop and the shoulder impedes vertical movement of the pen claw within a portion of its vertical movement;
    a means for measuring the distance of vertical movement of the pen claw, and for providing an output indicative of the distance of vertical movement;
    whereby a pen is sensed by energizing the pen claw to move the shoulder towards the stop until the movement of the pen claw is substantially impeded and measuring the distance of vertical movement.

11. The sensing apparatus as claimed in claim 10 wherein the shoulder is a portion of the pen.

12. The sensing apparatus as claimed in claim 11 wherein the pen has an annular ring comprising the shoulder.

13. The sensing apparatus as claimed in claim 10 wherein the measuring means comprises an encoding strip connected to the pen claw and an encoder connected to the drawing arm.

14. The sensing apparatus as claimed in claim 10 wherein the stop is positioned below the extended shoulder when the pen claw is in the upward position proximate to the stop.

15. A method for sensing whether a pen is in the grasp of a pen claw of a drawing arm of a plotter or other graphics mechanism, the pen or the pen claw being an impediment at a fixed distance with respect to the drawing arm when the pen is in the grasp of the pen claw, the pen or the pen claw not defining the impediment at the fixed distance when the pen is not in the grasp of the pen claw, said pen claw being movable relative to said plotter, said method comprising the steps of:

first, providing a pen stop on the plotter or other graphics mechanism;

second, positioning the pen claw so that the impediment, if present, is proximate to, and positioned vertically above, the pen stop;

third, energizing the pen claw to move in a downward direction so that the movement will be substantially impeded by the pen stop if said impediment is present; and fourth, observing whether said movement of said pen claw is substantially impeded in said third step.

* * * * *